United States Patent [19]

Dickerson

[11] 4,327,493
[45] May 4, 1982

[54] METHOD AND APPARATUS FOR MEASUREMENT OF DISTANCE BETWEEN HOLES WITH PARALLEL AXES

[75] Inventor: Lee R. Dickerson, Austin, Tex.

[73] Assignee: The United States of America as represented by the Secretary of the Navy, Washington, D.C.

[21] Appl. No.: 127,004

[22] Filed: Mar. 4, 1980

[51] Int. Cl.³ .............................................. G01B 5/14
[52] U.S. Cl. ................................................ 33/143 R
[58] Field of Search ..................... 33/158, 159, 143 R, 33/143 M, 147 K, 147 T, 172 D

[56] References Cited

U.S. PATENT DOCUMENTS 2,388,582 11/1945 Sorensen ........................... 33/147 R
3,289,307 12/1966 Kelly ................................. 33/158 X

FOREIGN PATENT DOCUMENTS 437824 11/1967 Switzerland ...................... 33/147 K
195701 4/1923 United Kingdom ................. 33/191

Primary Examiner—Harry N. Haroian
Attorney, Agent, or Firm—Robert F. Beers; William T. Ellis; Daniel R. Zirker

[57] ABSTRACT

A method for accurately determining the distance between the parallel axes of machined holes which avoids the precise coaxial alignment of measuring heads within the hole since there is no requirement that the measuring apparatus be precisely centered in the hole. The instrument required by the method employs a substantially cylindrical measuring head with a rotatable and expandable contactor perpendicularly extending from the base of each measuring head.

10 Claims, 2 Drawing Figures

FIG. I

METHOD AND APPARATUS FOR MEASUREMENT OF DISTANCE BETWEEN HOLES WITH PARALLEL AXES

BACKGROUND OF THE INVENTION

The present invention relates to a distance gauge and distance measuring method, and more particularly, to a method for measuring the center distance between holes with parallel axes, and a distance gauge which assists in these measurements.

Accurate measurement of the distance between parallel axes of machined holes is required, for example, when the holes are designed to house bearings which define the rotational centers of mating gears in a precision gearset. Prior-art methods vest accuracy either in a machine tool's integral measuring system, or in external devices such as vernier calipers and optical position indicators. In the integral system, axial separtion between holes is determined by measured movements along machine tool axes from one hole axis to the coordinate or polar site at which the location of the second feature is desired. Movement distances are governed by changes in readings of coordinate and angular dial settings of the machine. In the usage of external devices, the machine-tool settings are audited by readings taken from external position readouts, which readings reaffirm the center distance measurement.

The major problem encountered in generating two precision holes established between a precise interval has involved accurately centering a measuring instrument in a hole whose diameter changes with each pass of the boring tool. As the second hole's feature size (preferred diameter) is approached, more frequent confirmation of the holes location relative to its datum become necessary.

Prior-art distance gauges have been required to have hole center "finders" which must be precisely centered in the hole as well as being carefully tilted so as not to cause an error in measurement of the distance between the centers of the holes. The construction of conical measuring heads, as in U.S. Pat. No. 3,289,307, is one attempt to solve the problem, but the center of the probe must still be positioned precisely above the center of the hole, and this is difficult, as well as time-consuming.

SUMMARY OF THE INVENTION

This invention involves a method for measuring the center distance between holes with parallel axes, which utilizes a measuring apparatus that requires no precise coaxial alignment when positioned within the hole. The apparatus measures four orthogonal values at 90° intervals along the edges of both holes, and the distance between the vertical axes of both measuring heads is taken. The distance between the axes of the holes can be then calculated from this information.

This invention also involves an apparatus used in measuring the center distance between holes having parallel axes which includes: a rigid cross-bar with a pair of substantially cylindrical measuring heads attached thereto; a rotatable and expandable contactor located and perpendicularly extended from the base of each measuring head; and a means for measuring the amount of extension of the contactor.

OBJECTS OF THE INVENTION

An object of this invention is to create a method for measurement of spacing between holes with parallel axes which reduces the time and inconvenience involved in repeated auditing of the second hole's position.

A further object of this invention is to design a method which eliminates the problem of precisely centering a measuring instrument in a hole whose diameter changes with each pass of the boring tool.

Another object of this invention is to design a method which requires minimal hole preparation, such as deburring and chip removal, prior to each measuring operation.

A still further object of this invention is to design a measuring instrument that is highly accurate and can be rapidly read.

Yet another object of this invention is to design a measuring instrument which is not required to be a certain geometric shape necessary for coaxial alignment with the hole axes.

BRIEF DESCRIPTION OF THE DRAWING

Other objects, advantages and novel features of the invention will become apparent from the following detailed description of the invention when considered in conjunction with the accompanying drawings wherein.

DETAILED DESCRIPTION

Figure 1:
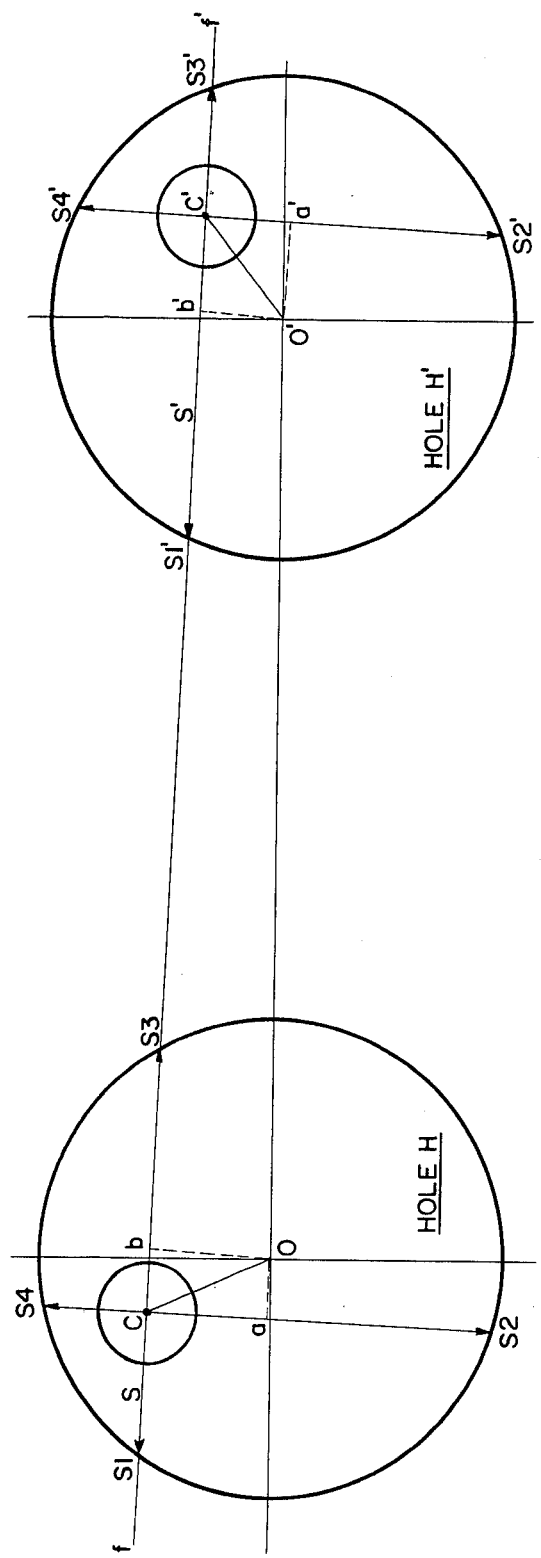
FIG. 1 is a schematic view of the geometric relationships between the various elements of the measuring gauge and the several readings that it records.
Figure 2:
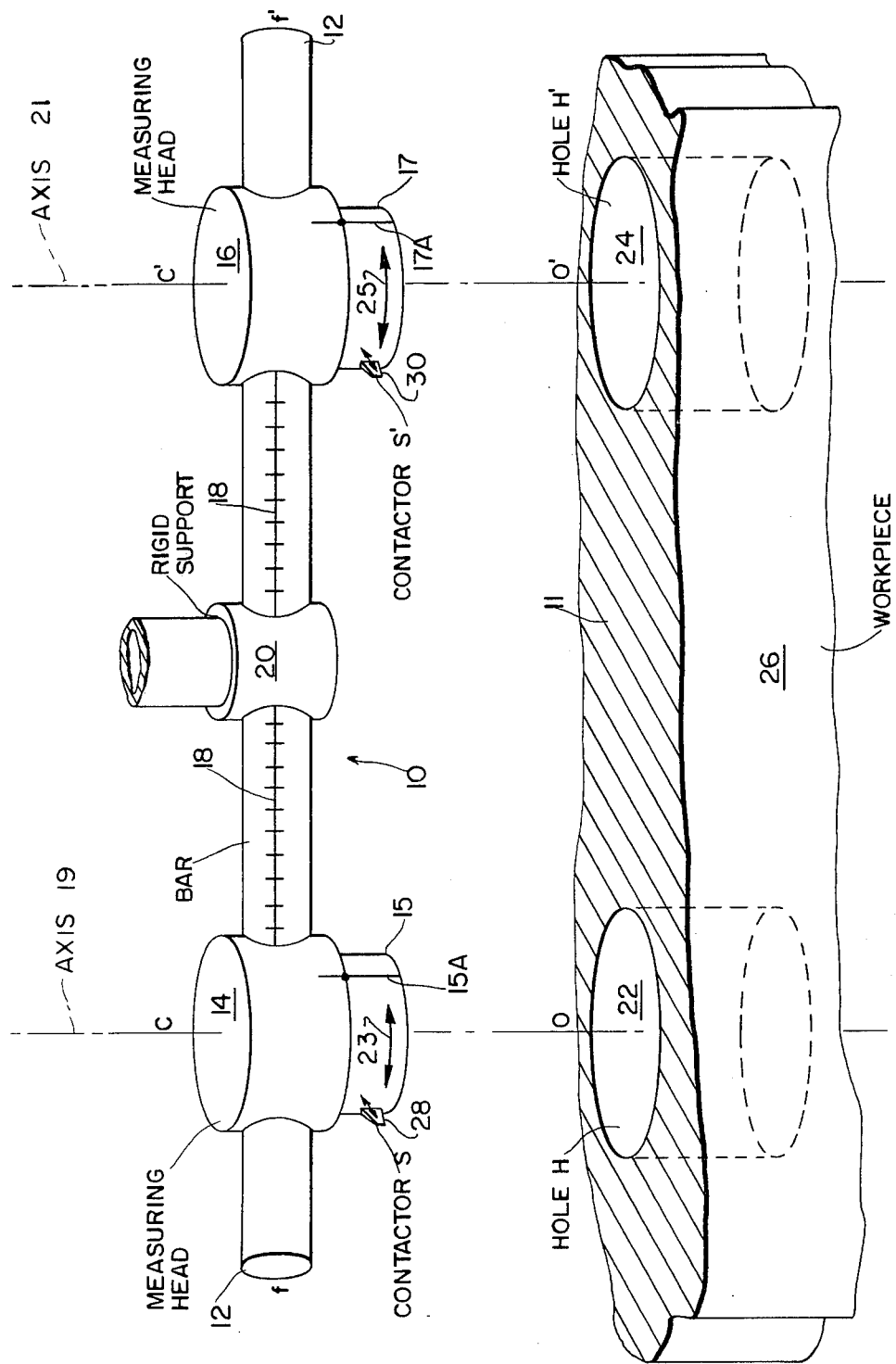
FIG. 2 is a frontal view of the distance gauge in its intended environment.

Viewing FIG. 1, which is a schematic view taken normal to the workpiece surface 11 of FIG. 2, two bored holes, H and H', whose parallel axes intersect the paper at 0 and 0', are disclosed.

Length 00' is the hole-axis to hole-axis center distance that is to be measured and controlled.

C is both the center of the measuring head in hole H and the rotational axis of and from which contactor S extends. Likewise, C' is the center of the measuring head in hole H' and the rotational axis of contactor S'.

In FIG. 1, values $s_1$, $s_2$, $s_3$, and $s_4$ shown in hole H represent distances from C to the wall of the hole in directions along and perpendicular to line CC'. The values $s_1$, $s_2$, $s_3$, and $s_4$ are collected at 90° intervals during one revolution of the contactor S about its center C. Similarly, values $s'_1$, $s'_2$, $s'_3$, and $s'_4$ are obtained by rotation of contactor S' about its center C' in hole H'.

It is to be understood that distance CC' or line distance on bar ff" is adjustable; that distance CC' may be independently set and measured with high accuracy; and, that distance CC' need not necessarily be equal to length 00', the allowable deviation being limited only by the excursional limit of the contactors S and S'. The length 00' may be calculated using only the known value of CC' and the four orthogonal readings gathered by each contactors S and S' while clamped rigidly in position, using the following derived relationship:

Viewing FIG. 1, if points a, a', b and b' are the midpoints of their respective chords, then $$00' = [(b0 - b'0')^2 + (CC' - Cb - C'b')^2]^{\frac{1}{2}} \quad (1)$$

But, $$b0 = Ca = \tfrac{1}{2}(Cs_4 - Cs_2) = \tfrac{1}{2}(s_4 - s_2), \quad (2)$$

$$b'0' = C'a' = \tfrac{1}{2}(C's_4' - C's_2') = \tfrac{1}{2}(s'_4 - s'_2), \quad (3)$$

$$a0 = Cb = \tfrac{1}{2}(Cs_1 - Cs_3) = \tfrac{1}{2}(s_1 - s_3), \quad (4)$$

and $$a'0' = C'b' = \tfrac{1}{2}(C's_3' - C's_1') = \tfrac{1}{2}(s_3' - s_1'). \quad (5)$$

Thus, $$00' = \{[\tfrac{1}{2}(s_4 - s_2) - \tfrac{1}{2}(s_4' - s_2')]^2 + [CC' - \tfrac{1}{2}(s_1 - s_3) - \tfrac{1}{2}(s_3's_1')]^2\}^{\tfrac{1}{2}}$$

The s value differences which appear in the above equations are simply the numerical values of the respective differences in the readings of opposing contactor pairs. Since the formula requires only the differences in the contactor distance readings, such problems as the precise shape of the spherical contactors and the exact point of tangency of the hole wall on the contact point are not necessary for an accurate calculation.

The measuring gauge 10 is shown illustrated in its intended environment in FIG. 2. Gauge 10 consists of rigid measuring bar 12 (ff', corresponding to the geometric terminology of FIG. 1) with a pair of substantially tubular measuring heads 14 and 16 which are slidably and adjustably mounted on an elongate bar or mounting member 12 with their axes at right angles to the axis or extent of the bar. Cross-bar 12 is equipped with a conventional graduated scale 18 for measurement of the distance between the axes of the two measuring heads (C,C'). The gauge 10 is locked spatially against any movement by rigid support means 20 once measuring heads 14 and 16 are firmly positioned within holes 22 and 24 of workpiece 26. Rigid support means 20 can take one of several forms, and need not extend vertically from measuring bar 12. What is essential is that it can be firmly anchored, when the measuring heads are precisely positioned within the holes 22, 24, to a fixed external source, i.e., a milling machine or other object that is stationary relative to workpiece 26. The support means need not be mechanical, i.e., a magnet, or other suitable equivalents, can also be used. The measuring heads 14 and 16 are substantially cylindrical in shape, each having or including respective cylindrically shaped lower base 15 and 17 so as to be able to firmly and easily fit into holes 22 and 24. Each lower base is mounted on its measuring head about respective axes 19 and 21 and adpated to be rotated thereabout as indicated by arrows 23 and 25 in FIG. 2. Each measuring head is equipped with a rotatable base which includes an expandable or extendable contactor, 28(S) and 30(S'), each of which is preferably, though not limited to, a thin rigid rod perpendicularly extending from the base 15 and 17 of its respective measuring head. The lower bases 15 and 17 of the measuring heads are equipped with 4 detents, 15A and 17A, or other equivalent momentary locking means. In the preferred embodiment, the 4 detents 15A and 17A are each small stub-like projections which extend from the outer-wall of rotatable bases 15 and 17 at precise 90° intervals, and which are adapted to snugly fit in a single groove, or slot, that extends into the inner wall of measuring heads 14 and 16, the slot being dimisioned to snugly hold each of the detents, yet is adapted to easily release once the measurement has been taken; so the contactors 28 and 30 can revolve with the bases 15 and 17 until they again are securely positioned at the next 90° interval as the next detent stub locks inside the groove. This particular locking means, however, is but one of many which can be used to lock bases 15 and 17 to measuring heads 14 and 16 when contactor readings are desired to be taken. The contactors are then extended by means not illustrated to the inside wall of their respective holes, at which point the radius of the outermost edge of the contactor is greater than the radius of the measuring head it extends from. The S values (distances from C or C' to respective wall positions of holes H or H') are then measured and the readings recorded by a means for measuring the amount of extension of the contactors, such as a dial indicator or differential transformer. A Dial Indicator (not shown in the Figure) is a device somewhat watchlike in appearance which records and mechanically amplifies the axial motion of a rod. It also functions analogous to a watch, by using a gears-and-bearings structure that, by choosing suitable gear ratios, can magnify distances up to 1/10,000 of an inch and even smaller. In contrast, a Differential Transformer measures small distances by employing electrical inductance principles. The device is essentially two electrical coils with a metal rod between them; when the position of the central rod, which corresponds to the axial distance to be measured, changes, the electrical inductance of the system also changes, and this change in inductance can easily be calibrated to correspond to a change in axial position. Both dial indicators and differential transformers are well known in the art.

The invention also comprises a method for measuring the center distance between holes with parallel axes comprising aligning the bar 12 with the center distance to be measured, placing the measuring heads 14 and 16 into holes 22 and 24 of workpiece 26 at a distance substantially the same as the center distance between the holes which is desired to be found, extending each contactor 28 and 30 to the inside wall of their respective holes, locking the rigid cross bar 12 so that it is in a fixed position, rotating each contactor in a 360° revolution within its hole and at every 90° measure the particular orthogonal reading which is the amount of extension of the particular contactor. Finally, the desired distance is calculated using the relationship of Equation 6 derived earlier.

It is to be noted that only a preferred embodiment of the invention has been described above, and that several elements, such as the precise geometry and structure of the measuring heads and contactors, are capable of modification, and that obviously many other modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A gauge for measuring the center to center distance between two cylindrical holes located on parallel axes, comprising:
   an elongate mounting member having a longitudinal extent;
   a pair of measuring heads mounted on the elongate mounting member and adapted for selective space-apart longitudinal positioning thereon;
   said measuring heads including portions rotatably mounted thereon about axes normal to the longitudinal extent of the elongate mounting member and parallel to each other;

said portions adapted to be received within respective cylindrical holes with their axes parallel with the cylindrical hole axes and fixedly restrained therein; and radially extendable contactor means carried on each rotatable portion and upon extension adapted to measure distances from the axis of the rotatable portion to four positions at 90° spacings on the wall of the cylindrical hole;

whereby the center to center distance between the two cylindrical holes is calculated according to the formula:

$$OO' = \{[\tfrac{1}{2}(s_4-s_2)-\tfrac{1}{2}(s_4'-s_2')^2] + [CC'+\tfrac{1}{2}(s_1-s_3)+\tfrac{1}{2}(s_3'-s_1')]^2\}^{\tfrac{1}{2}}$$

wherein, $OO'$ is the center to center distance between cylindrical holes to be measured; $C$ is the axis of one rotatable portion; $C'$ is the axis of the other rotatable portion; $CC'$ is the distance between axes of the rotatable portions when they are restrained in the cylindrical holes; $s_1$ and $s_3$ are the distances from $C$ to the hole wall in opposite directions aligned with $CC'$; $s_1'$ and $s_3'$ are the distances from $C'$ to the hole wall in opposite directions but aligned with $CC'$; $s_2$ and $s_4$ are the distances from $C$ to the hole wall in opposite directions normal to $CC'$; and, $s_2'$ and $s_4'$ are the distances from $C'$ to the hole wall in opposite directions normal to $CC'$.

2. The invention according to claim 1 wherein the elongate mounting member is a bar having an axis disposed along its longitudinal extent.

3. The invention according to claim 2 wherein the measuring heads are slidably mounted on the bar and are adapted for being fixedly secured thereto at spaced apart locations.

4. The invention according to claim 2 or 3 wherein the measuring heads are substantially cylindrical.

5. The invention according to claim 4 wherein the rotatable portions are substantially cylindrical.

6. The invention according to claim 4 the mounting heads and respective rotatable portions are coaxial.

7. The invention according to claims 2, 3, 4, 5 or 6 wherein the axes of the rotatable portions are each normal to the axis of the bar.

8. The invention according to claim 7 wherein the bar is provided with means for indicating the distance between axes of the rotatable portions.

9. A method of measuring the center to center distance between two cylindrical holes located on parallel axes comprising the steps of:

inserting measuring heads disposed on parallel axes into respective cylindrical holes and fixedly securing them with respect thereto;

determining the distance between the measuring head axes;

determining the distances from each measuring head axis to the walls of respective holes at four 90° intervals; and, calculating the center to center distance between the two cylindrical holes by the formula:

$$OO' = \{[\tfrac{1}{2}(s_4-s_2)-\tfrac{1}{2}(s_4'-s_2')^2] + [CC'+\tfrac{1}{2}(s_1-s_3)+\tfrac{1}{2}(s_3'-s_1')]^2\}^{\tfrac{1}{2}}$$

wherein, $OO'$ is the center to center distance between cylindrical holes to be measured; $C$ is the axis of one measuring head; $C$ is the axis of the other measuring head; $CC'$ is the distance between axes of the measuring heads; $s_1$ and $s_3$ are the distances from $C$ to the hole wall in opposite directions but aligned with $CC'$; $s_1'$ and $s_3'$ are the distances from $DC'$ to the hole wall in opposite directions but aligned with $CC'$; $s_2$ and $s_4$ are the distances from $C$ to the hole wall in opposite directions normal to $CC'$; and, $s_2'$ and $s_4'$ are the distances from $C'$ to the hole wall in opposite directions normal to $CC'$.

10. A method of determining the center to center distance between two cylindrical holes located on parallel axes comprising the steps of:

determining the line distance between two fixed points, one in each hole;

determining the radial distance between each point and four positions at 90° intervals about the wall of each hole; and, calculating the center to center distance ($OO'$) between the two cylindrical holes by the formula.

$$OO' = \{[\tfrac{1}{2}(s_4-s_2)-\tfrac{1}{2}(s_4'-s_2')^2] + [CC'+\tfrac{1}{2}(s_1-s_3)+\tfrac{1}{2}(s_3'-s_1')]^2\}^{\tfrac{1}{2}}$$

wherein $C$ is one fixed point; $C'$ is the other fixed point; $CC'$ is the line distance between the two fixed points; $s_1$ and $s_2$ are the two distances from one fixed point to walls in opposite directions but aligned with the line distance; $s_1'$ and $s_3'$ are the two distances from the other fixed point to walls in opposite directions but aligned with the line distance; $s_2$ and $s_4$ are the two distances from the one fixed point to walls in opposite directions perpendicular to the line distance; and, $s_2'$ and $s_4'$ are the two distances from the other fixed point to walls in opposite directions perpendicular to the line distance.

* * * * *